(No Model.) 2 Sheets—Sheet 1.
J. H. GMELIN.
STOVE LID LIFTER AND KETTLE HOLDER AND DRAINER.
No. 506,173. Patented Oct. 3, 1893.

Witnesses

Inventor
Jacob Henry Gmelin (No Model.) 2 Sheets—Sheet 2.

J. H. GMELIN.
STOVE LID LIFTER AND KETTLE HOLDER AND DRAINER.

No. 506,173. Patented Oct. 3, 1893.

Inventor
Jacob Henry Gmelin

Witnesses
H W Taylor
F H Gibbs

UNITED STATES PATENT OFFICE.

JACOB HENRY GMELIN, OF WEST BAY CITY, MICHIGAN.

STOVE-LID LIFTER AND KETTLE HOLDER AND DRAINER.

SPECIFICATION forming part of Letters Patent No. 506,173, dated October 3, 1893.

Application filed May 11, 1893. Serial No. 473,888. (No model.)

*To all whom it may concern:*

Be it known that I, JACOB HENRY GMELIN, a citizen of the United States, residing at West Bay City, in the county of Bay and State of Michigan, have invented certain new and useful Improvements in Stove-Lid Lifters and Kettle Holders and Drainers, of which the following is a specification, reference being had therein to the accompanying drawings.

This invention relates to improvements in stove lid lifters and kettle holders and drainers, and it consists in the combination arrangement and construction of the parts with the objects of producing a device for lifting stove lids, and lifting and draining kettles.

Another object of the invention is to construct a stove lid lifter and kettle holder and drainer with a shield attached to protect the hand from being burned when lifting the lids from a hot stove or from steam when lifting or draining a kettle. It is at the same time simple and cheap in its adjustments and operation.

My improved stove lid lifter and kettle holder and drainer is illustrated in the accompanying drawings in which the same letters of reference will be found indicating the same parts or elements throughout the several views.

Figure 1:
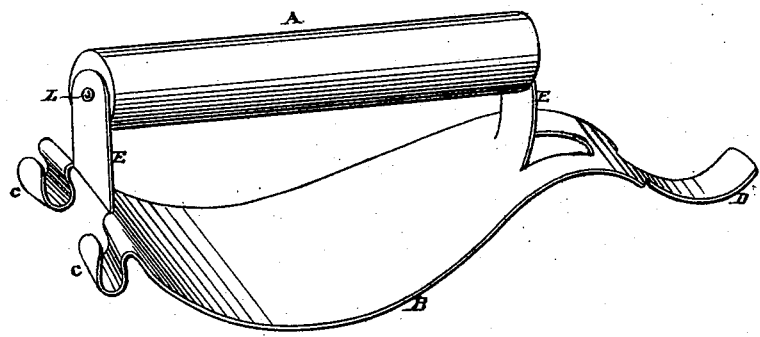
Figure 2:
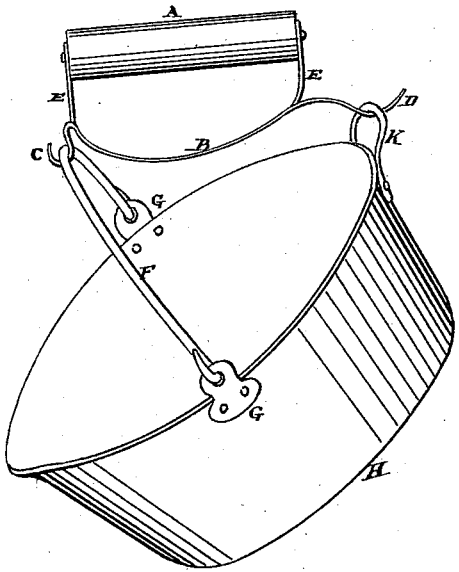
Figure 3:
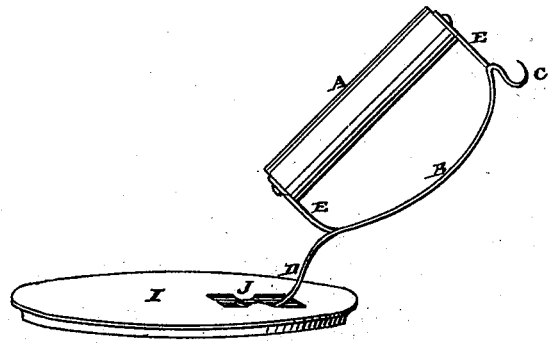

Figure 1, represents a perspective view of my invention. Fig 2, is a side view showing it in position when in the act of draining a kettle. Fig. 3, is also a side view showing it in position when lifting the lid of a stove.

In Fig. 1, A represents a handle made of any suitable substance and B the shield cut from sheet steel with lugs E E turned upwardly for the purpose of securing handle A, by means of rod L.

C C represent hooks for the purpose of lifting the bail of a kettle as shown in Fig. 2 said kettle provided with bail F secured by ears G, G, to kettle H.

In Fig. 1, D represents a hook for the purpose of catching in the handle of a kettle as shown at K Fig. 2 and for the purpose of lifting a stove lid as shown at Fig. 3, said lid being provided with the slot J.

What I claim as my invention, and desire to secure by Letters Patent, is—

The combination of a stove lid lifter, kettle holder and drainer, having a shield B with hooks C C and hook D with lugs E E turned upwardly and handle A fixed thereto by means of a rod L, substantiatly as set forth.

JACOB HENRY GMELIN.

Witnesses:
F. H. GIBBS,
H. W. TAYLOR.